(No Model.) 4 Sheets—Sheet 1.
D. M. HOLMES.
CAKE MACHINE.
No. 323,681. Patented Aug. 4, 1885.
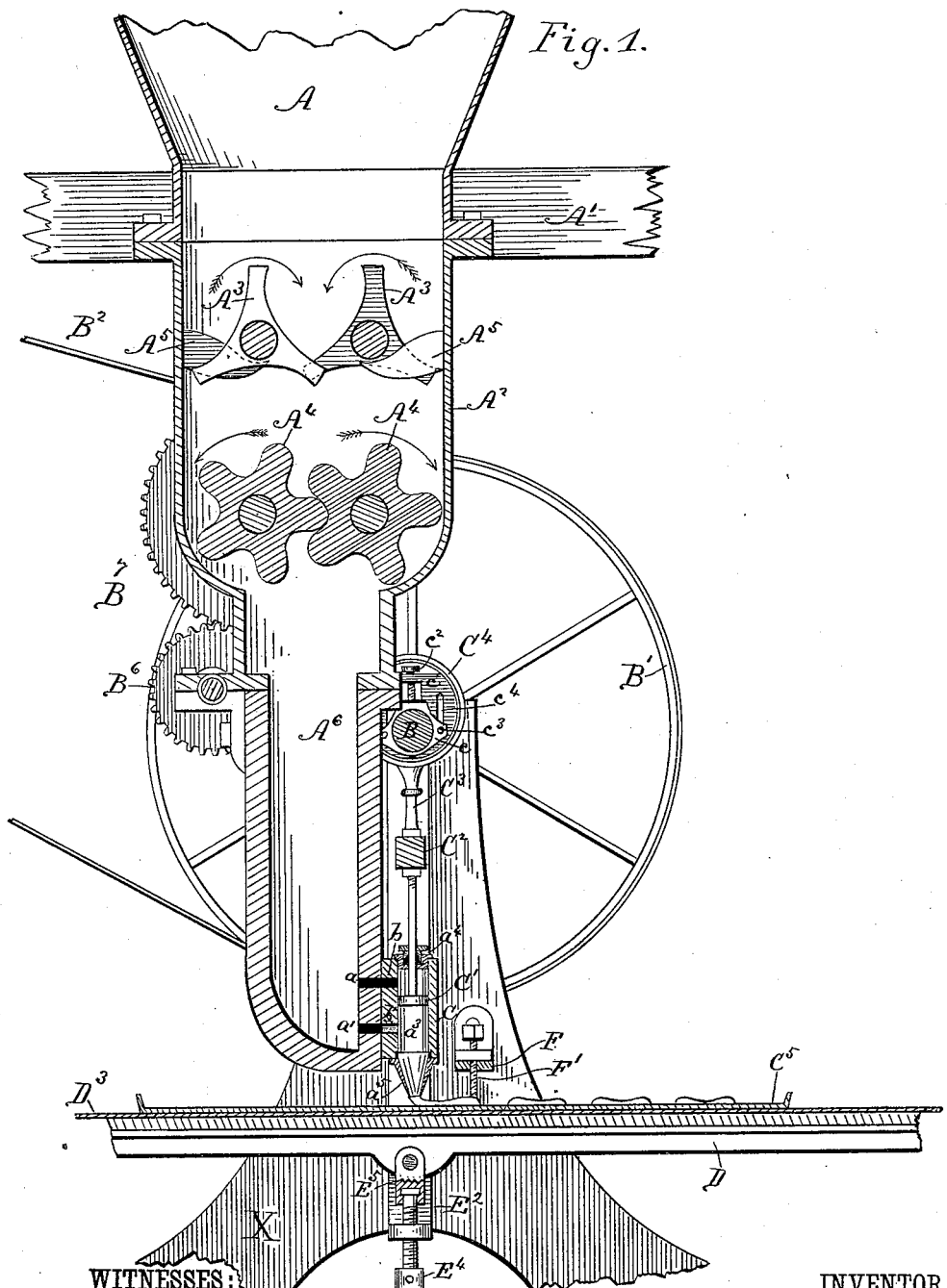

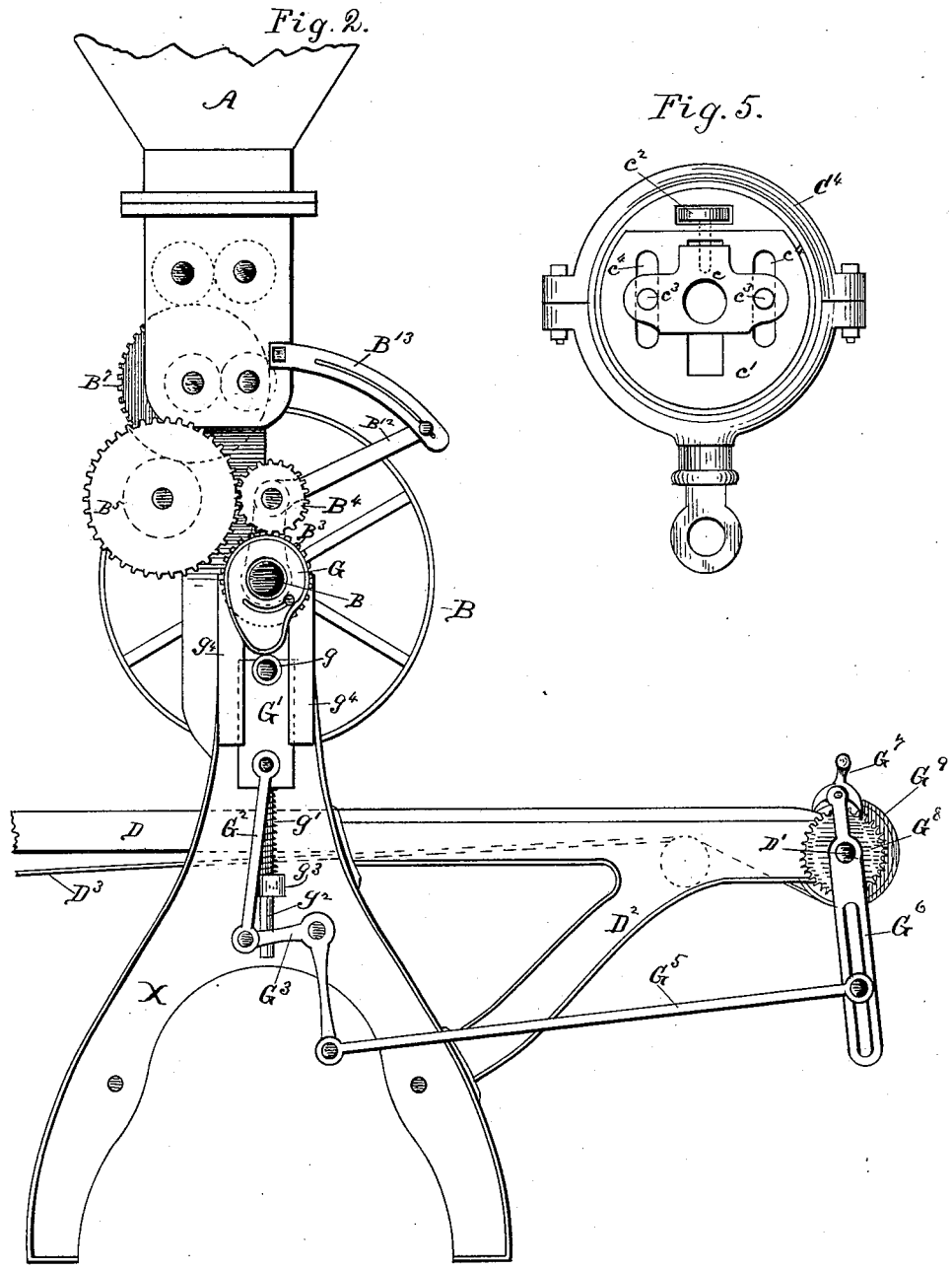

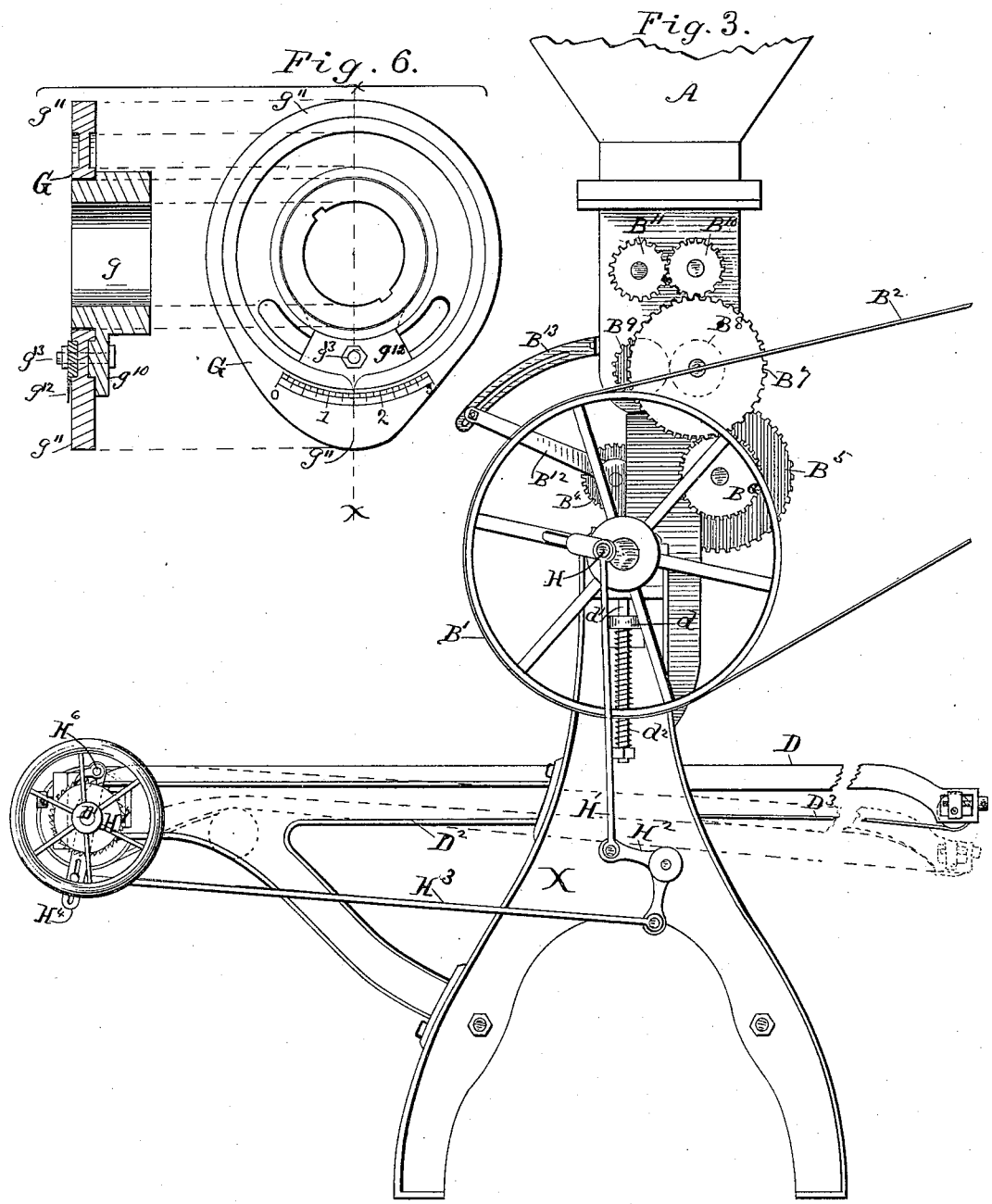

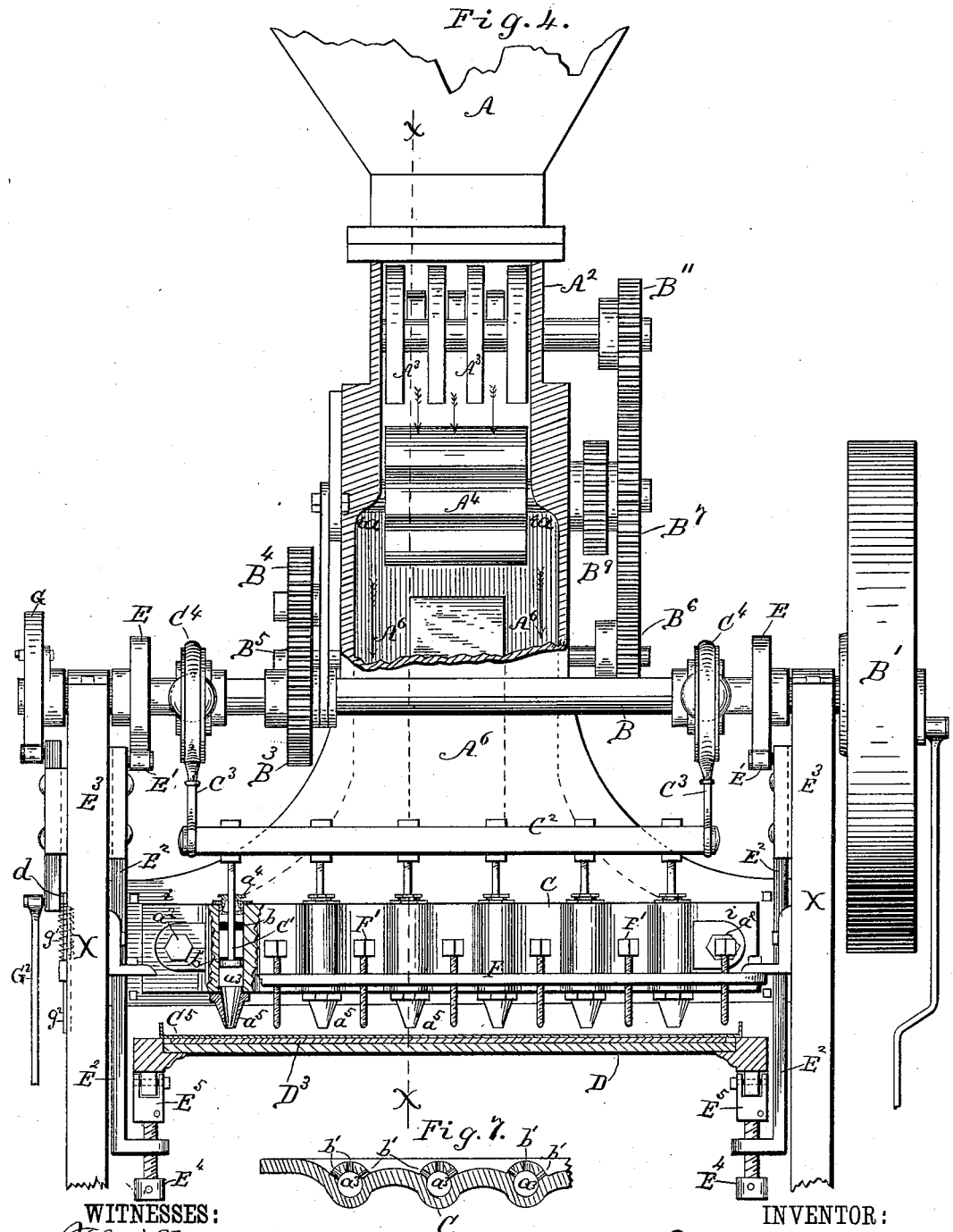

UNITED STATES PATENT OFFICE.

DANIEL M. HOLMES, OF ARLINGTON, NEW JERSEY.

CAKE-MACHINE.

SPECIFICATION forming part of Letters Patent No. 323,681, dated August 4, 1885.

Application filed November 8, 1884. (No model.)

*To all whom it may concern:*

Be it known that I, DANIEL M. HOLMES, a citizen of the United States, residing at Arlington, in the county of Hudson and State of New Jersey, have invented certain new and useful Improvements in Cake-Machines, of which the following is a description.

Figure 1 is a vertical longitudinal section through the dough feeding and delivering devices. Fig. 2 is a side elevation of the machine; Fig. 3, a side elevation from the opposite side. Fig. 4 is a vertical cross-section through the table, showing the dough-feeding devices partly in section and partly in side elevation. Fig. 5 is a detail view of the adjustable eccentric. Fig. 6 represents details of the adjustable cam G in side and sectional views. Fig. 7 is a horizontal section of plate C, taken through the lower openings, $b'$.

My invention relates to cake-machines of that class in which the dough is fed down from a hopper into a series of cylinders, whence it is forced by reciprocating plungers in small lumps upon pans carried by an endless apron.

My invention consists in certain features of improvement upon the several parts of the machine whereby its efficiency and range of use are increased, as hereinafter fully described.

In the drawings, (see Fig. 1,) A represents the hopper of the machine, into which large quantities of the dough are placed as taken from the mixer, and which hopper, for convenience, usually opens through the floor A' of the room above that in which the machine is placed, and is fastened to the chamber $A^2$, in which is located the packing and feeding devices for securing a forced feed of the dough. These devices consist of packers $A^3 A^3$ and feeders $A^4 A^4$. The packers are composed of shafts with radial arms alternating with each other in the middle, (see Fig. 4,) and alternating with stationary projections $A^5 A^5$ from the sides of the chamber. (See Fig. 1.) These packers revolve inwardly toward each other, and as their arms go down in the middle they force the dough down, which dough is scraped off and prevented from following the arms by the alternating projections $A^5$ on the sides of the chamber. The lower part of the case $A^2$ is drawn together with a curve, and in the bottom of the case, at the curve, is placed on each side a feeder-roll, $A^4$, each of which has corrugations longitudinal to its axis, which corrugations of the two rolls mesh with each other, like the teeth of a gear-wheel. These rolls revolve away from each other, or in opposite direction to the packers, and the dough is forced downwardly between the corrugations and the sides of the case, and as the rollers mesh tightly together in the middle the dough is forced down into the throats $A^6$.

To make the dough feed more easily I chamber the case at *ta ta*, (see Fig. 4,) at the ends of the rolls, from about the axis of the same downwardly, so that as the dough is squeezed between the rolls it moves endwise to the rolls and down these chambered spaces in the case into the two channels or throats $A^6$. For driving these packers and feeders a main shaft, B, is journaled in the frame-work X, and is driven through a belt, $B^2$, and pulley B'. On this main shaft (see Fig. 4) is fixed a gear-wheel, $B^3$, which meshes with a wheel, $B^4$, (see Figs. 4 and 2,) and this wheel $B^4$ meshes with wheel $B^5$, which is on the same shaft with $B^6$ on the opposite side of the machine. (See Fig. 4.) This wheel $B^6$ meshes with gear $B^7$, (see Fig. 3,) which is on the shaft of one of the feed-rolls $A^4$, and which shaft has a smaller gear, $B^8$, that meshes with another of equal size, $B^9$, on the other feed-roll $A^4$.

Into the gear $B^7$ a gear, $B^{10}$, meshes, which is fast on the shaft of one of the packers $A^3$, and another gear, $B^4$, on the shaft of the other packer-roll, meshes with the similar-sized gear $B^{10}$ of the first packer. In this manner positive motion is given to all the packer and feed rolls.

For changing the speed of the packer and feed rolls for increasing or diminishing the delivery of dough, the wheel $B^5$, Fig. 2, is made detachable, and different sizes of the same are provided, and the gear $B^4$ is carried in an arm, $B^{12}$, which is hung about the main shaft B as a center, and which arm is provided with a set-screw for fixing it in the curved slotted arm $B^{13}$. This permits the position of the wheel $B^4$ to be changed to correspond to the substitution of a larger or smaller wheel, $B^5$, and still connects said wheel $B^5$ with the wheel $B^3$ on the main shaft.

For increasing the feed or delivery of dough a smaller wheel, $B^5$, is used, and vice versa.

The sides of the dough-channel A⁶ are fastened to the frame X by means of flanges and bolts, and this throat or dough-conduit has near its bottom, on the side, two horizontal slots or outlets, $a$ $a'$. Against this portion of the dough-conduit is fastened by bolts $a^2$, Fig. 4, a casting, C, having cylindrical chambers $a^3$, Figs. 1 and 4, bored therein and occupying a vertical position. The tops of these chambers are closed by stuffing-boxes $a^4$, and the bottoms have detachable screw-nozzles $a^5$. The casting C has at the top a slot, $b$, registering with the slot $a$ of the dough-channel, and communicating with the interior of the cylinders, and below this has a series of holes, $b'$, (see Fig. 7,) which register with the lower slot, $a'$, and communicate with the interior of the cylinders. Within these cylinders are the plungers C′, whose rods pass through the stuffing-boxes and are connected by nuts with the cross-bar C². This cross-bar is connected to the eccentric-rods C³, which are reciprocated vertically by the eccentrics C⁴ on the main shaft B. Through these eccentrics the plungers are reciprocated vertically in the cylinders, and the dough is made to issue intermittently through the nozzles and drop upon the pans C⁵, placed on the endless traveling apron.

The object in having the two openings into the cylinders, the one set, $a$ $b$, being above and the other, $a'$ $b'$, being below the plunger, is as follows: The feeding devices A³ A⁴ act continuously, and the dough is through the plungers discharged intermittently, and when the plunger rises above holes $a'$ $b'$ dough passes in through these holes; but when the plunger passes by these holes on the downstroke the dough passes in behind the plunger through holes $a$ $b$. Then on the upstroke again dough passes into the cylinders through $a'$ $b'$, and out of the cylinder through $a$ $b$, thus causing the dough to pulsate through the opening $a$ $b$. The good effect produced is, first, that the plunger C has a packing of dough on both sides, so that it cannot leak air and cause an irregular feed of dough; and, secondly, the continuous feed from above is compensated for by a practically-continuous discharge through holes $a$ $b$ and $a'$ $b'$ below, the dough passing into the cylinder always entering either through the openings $a$ $b$ or $a'$ $b'$, or through openings $a'$ $b'$ on the upstroke and $a$ $b$ on the downstroke, thus securing uniformity of action.

The object in having holes at $b'$ instead of a slot, as at $b$ alone, is to enable the plunger to pass smoothly across these openings $b'$.

In order to give to the plunger C a variable throw to adapt the plunger to the variable or adjustable feed of the rollers above, the eccentric C⁴, (see Figs. 1 and 5,) has a block, $c$, which is rigidly fixed upon the shaft B, and is made adjustable within the circular plate $c'$ of the eccentric, its adjustment being effected by a set-screw, $c^2$, and its position fixed by bolts $c^3$ $c^3$, which pass through slots $c^4$ $c^4$ in the plate $c'$, and, which when clamped tightly, holds the block $c$ more or less eccentric within the plate $c'$.

D is the table of the machine, which is hung upon the shaft D′, journaled in the bracket D², offsetting from the frame X, and having an oscillation thereabout as a center, as shown by the dotted lines in Fig. 3. This table has an endless apron, D³, distended over rollers at each end of the table. To this belt a triple motion is imparted: First an up-and-down oscillation of the belt and the table about the shaft D′ of the roller upon which the table is hung. This gives room between the nozzles $a^5$ and the pans C⁵ for the issue and clearance of the dough. The second is a longitudinal movement of the apron, which gives shape to the cake by stretching out the dough; and the third is a longitudinal movement of the apron alternating with the other longitudinal movement to space the cakes in the pan.

I will first describe the means for effecting the up-and-down movement of the apron and table. Referring to Fig. 4, E E on shaft B are cams that bear upon anti-friction rollers E′ E′, attached to vertically-sliding hanger-bars E² E², which move in guides E³ E³, attached to the frame-work X. These hanger-bars have inwardly-projecting lugs at their lower ends, Figs. 1 and 4, through which are tapped set-screws E⁴ E⁴, that are swiveled in blocks E⁵ E⁵ jointed to the bottom of the table. These set-screws, it will be seen, provide a vertical adjustment of the table to or from the nozzles. Upon each of the hanger-bars E² is also attached a perforated lug, $d$, Fig. 3, that passes through a vertical slot in the side frame and encompasses a pendent rod, $d'$, which at its upper end is made fast to the frame, and at its lower end bears a nut, between which nut and the lug $d$ of the hanger-bar is wound a spiral spring, $d^2$, which opposes the descent of the lug on the hanger-bar, so that as the shaft B revolves its cam E forces down the hanger-bars and the table, and after the cams have ceased to act the spiral springs lift the table again. To stop the table in proper proximity to the nozzles, a cross-bar, F, is fastened to the frame-work X by brackets transversely to the belt and just beside the dough-discharging devices, and through the bar is tapped a series of adjustable stop-screws, F′, against which the pans on the apron strike to preserve the proper distance of the latter from the nozzles, and to cause the bottom of the pan (which is sometimes warped or buckled) to lie steady and flat while the cakes are being laid thereon.

I will now describe the means for giving the two longitudinal movements to the belt. I have found that by giving two separate movements to the belt one can be utilized for spacing the cakes, and the other, by proper construction of the actuating mechanism, can be made to vary the shape of the cake.

For spacing the cakes or moving the belt between the deposits of dough in the pan a wrist-pin, H, (see Fig. 3,) on a disk at the end of the shaft B, imparts motion to a pitman, H', and this, acting upon a bell-crank, H², and pitman H³, oscillates lever H⁴, which, through a pawl, H⁶, operating upon ratchet H⁷, turns the shaft of the main roll with an intermittent step-by-step motion, which is imparted to the apron distended about said roll. On the opposite side of the machine is arranged the mechanism for moving the belt to vary the shape of the cakes. After the spacing mechanism has done its work and the belt and pans are ready to receive the dough, I find that while the dough is issuing from the nozzles, if I vary the speed of the belt, I can vary the shape of the cakes—thus for making "ladyfingers," which are large at both ends and small in the middle, the belt is moved very slowly when the dough first commences to issue, which makes one of the ends large. Then the speed is increased, which draws out the dough and makes the middle small, after which the speed is slackened again, which makes the other end large. To accomplish this mechanically I use a cam, G, (see Fig. 2,) which is adjustably fixed to shaft B and bears against an anti-friction roller, $g$, on slide G', which moves in guides $g^4$. This slide is raised again by the action of a spiral spring, $g'$, wound upon a stem, $g^2$, projecting from the slide G' through a guide-lug, $g^3$. The movement of the slide is imparted through the pitman G², bell-crank G³, and pitman G⁵, to an oscillating lever bearing a pawl, G⁷, which latter operates upon a ratchet-wheel, G⁸, on the roller G⁹, which distends the belt. It will be seen that by the shape of the cam G the throw of the lever G⁶ is at first slow, then fast, and then slow again, thus fulfilling the conditions for making the kinds of cakes referred to. By varying the shape of the cam G other shapes of cakes may be formed. After the cake is thus formed the apron and table move vertically to break connections of the dough, and the next longitudinal movement of the apron, produced by the mechanism on the other side, spaces the cakes for the next row.

In constructing cam G and attaching it to shaft B, I form it as shown in Fig. 6, in which a hub, $g$, with arm $g^{10}$, is keyed rigidly to the shaft, and the cam proper, $g^{11}$, is of an annular shape, and is slotted to permit a bolt, $g^{13}$, to pass through, that connects a pointer, $g^{12}$, to the arm $g^{10}$ on the rear side. This pointer moves over a scale on the cam, so that when the latter is adjusted to any position by bolt $g^{13}$ for a definite size or shape of cake, that size or shape of cake may be quickly and easily gotten again by noting the adjustment of the cam by the scale.

Having thus described my invention, what I claim as new is—

1. The combination, with the dough-chamber having inward-projecting scrapers A⁵, of the two packing-rolls A³ A³, provided with alternating radial arms arranged to revolve toward each other and descend in the middle, as shown and described.

2. The combination, with the force-feed rolls A⁴ A⁴, having corrugations meshing with each other, as described, of the case or chamber having enlarged openings or passages $ta$ $ta$ at the ends of the rolls, as and for the purpose described.

3. The combination, with the dough-chamber, of the corrugated feed-rolls A⁴ A⁴, arranged to revolve away from each other, and the packing-rolls A³ A³, consisting of radial arms located above the feed-rolls and arranged to revolve toward each other, and the scrapers or projections A⁵ A⁵, attached to the sides of the case and alternating with the arms of the packing-rolls, as described.

4. The combination, with the dough-cylinders, their plungers, and the devices for feeding dough, and gears for varying the feed, of the main drive-shaft B and the adjustable eccentrics C⁴, as and for the purpose described.

5. The plate C, having dough-cylinders $a^3$ bored therein, in combination with the stuffing-boxes $a^4$, the nozzles $a^5$, and the plungers C', as and for the purpose described.

6. The dough-cylinder C, having upper opening, $b$, and lower opening, $a$, with stuffing-box at the top, in combination with the plunger C', working between said openings, as shown and described.

7. The combination, with the dough-discharging nozzles, of the table hung horizontally at one side of the nozzles, and its oscillating devices, consisting of the jointed blocks E⁵, set-screws E⁴, hanger-bars E², cams E, for depressing the hanger-blocks, and sets of spiral springs $d^2$, for raising it, substantially as shown and described.

8. The hub $g$, with arm $g^{10}$, in combination with the adjustable cam $g^{11}$, having scale, the pointer $g^{12}$ and bolt $g^{13}$, and the working mechanism of the cake-machine, consisting of spring-seated slide G', pitman G², elbow-crank G³, pitman G⁵, the lever G⁶, bearing-pawl, and the belt-roller and ratchet operated upon by said pawl, as described.

9. The combination, with a set of dough-delivering devices, of an endless apron and two sets of mechanism for giving intermittent motion to the belt, one mechanism for spacing the cakes and the other being independent of the first and variable for varying the shape of the cakes, as shown and described.

10. The combination, with a set of dough-delivering nozzles and an endless belt, of a main drive-shaft, means for transmitting motion from the drive-shaft to the belt in an intermittent manner, and a cam located on the main drive-shaft and made of a shape to correspond to and govern the shape of the cakes being formed by giving a variable draw to the dough as it issues from the nozzles, as set forth.

DANIEL M. HOLMES.

Witnesses:
EDWD. W. BYRN,
SOLON C. KEMON,